United States Patent
Oyama (10) Patent No.: US 7,463,300 B2
(45) Date of Patent: Dec. 9, 2008

(54) IMAGE SENSING APPARATUS, DISPLAY CONTROL METHOD, AND DISPLAY CONTROL PROGRAM

(75) Inventor: Yasufumi Oyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 846 days.

(21) Appl. No.: 10/959,104

(22) Filed: Oct. 7, 2004

(65) Prior Publication Data
US 2005/0094018 A1    May 5, 2005

(30) Foreign Application Priority Data
Oct. 29, 2003    (JP)    ............... 2003-368924

(51) Int. Cl.
H04N 13/00    (2006.01)
(52) U.S. Cl. ............... 348/333.12; 348/240.2
(58) Field of Classification Search ............. 348/240.1, 348/240.2, 240.99, 333.03, 333.05, 333.11, 348/333.12; 345/650, 654, 646, 670, 671, 345/472.2, 472.1; 715/815, 819, 820, 865
See application file for complete search history.

(56) References Cited

U.S. PATENT DOCUMENTS 6,587,119 B1 * 7/2003 Anderson et al. ........... 345/672
7,061,535 B2 * 6/2006 Misawa et al. .............. 348/375
2001/0013902 A1 * 8/2001 Kawabe ..................... 348/358

FOREIGN PATENT DOCUMENTS

| EP | 1028570 A1 * | 8/2000 |
| EP | 1246434 A1 * | 10/2002 |
| JP | 2000-284774 | 10/2000 |
| JP | 2001-134262 | 5/2001 |

* cited by examiner

Primary Examiner—Lin Ye
Assistant Examiner—Mekonnen Dagnew
(74) Attorney, Agent, or Firm—Fitzpatrick, Cella, Harper & Scinto

(57) ABSTRACT

The sizes of objects indicating photographing conditions and/or the state of an image sensing apparatus displayed on a display unit of the image sensing apparatus can be changed by simple operation. When the operation of a zoom operation unit is detected, it is determined whether a menu for setting the photographing conditions and the like is displayed on the display unit. If the menu is displayed, the sizes of item objects of the menu displayed on the display unit are changed in accordance with whether the zoom operation unit is operated to a wide side or telephoto side. If the menu is not displayed, zooming is executed in accordance with the operation of the zoom operation unit.

10 Claims, 7 Drawing Sheets

IMAGE SENSING APPARATUS, DISPLAY CONTROL METHOD, AND DISPLAY CONTROL PROGRAM

FIELD OF THE INVENTION

The present invention relates to an image sensing apparatus, display control method, and display control program and, more particularly, to an image sensing apparatus for photographing an object through an optical system, a display control method of controlling information to be displayed on a display unit provided in the image sensing apparatus, and a program for the method.

BACKGROUND OF THE INVENTION

There is known an image sensing apparatus which displays, on a liquid crystal display, information (e.g., a menu) for selecting photographing conditions such as a photography mode, image quality (e.g., high or low), shutter speed (exposure time), F-number, exposure compensation, and the like to make a photographer select or set a desired photographing condition, or displays the current photographing conditions or the state of the image sensing apparatus. Examples of image sensing apparatuses are a silver halide camera which optically records an image on a film, an electronic camera (digital camera) which electronically records an image on an electronic recording medium (memory medium such as an EEPROM or hard disk), and the like.

Japanese Patent Laid-Open No. 2000-284774 discloses a character display method which facilitates selection of a desired character string from a plurality of character strings (items), and Japanese Patent Laid-Open No. 2001-134262 discloses an image display method which takes into consideration the visibility of characters when a composite image containing the characters is scaled. Note that both examples are not applications to an image sensing apparatus.

Along with a recent increase in functionality of an image sensing apparatus, information for selecting photographing conditions in the image sensing apparatus or information indicating the photographing conditions and the state of the image sensing apparatus increases. Increasing visibility and displaying much information within a physically limited display area are incompatible with each other. Whether to give high priority to visibility or the amount of information depends on the preference or application purpose of a photographer. It may be impossible to satisfy all photographers in all environments.

SUMMARY OF THE INVENTION

The present invention has been made on the basis of the recognition of the above-mentioned problem, and has as its object to, e.g., change the sizes of objects which are displayed on a display unit and indicate photographing conditions and/or the state of an image sensing apparatus by simple operation.

According to the present invention, there is provided an image sensing apparatus for photographing an object through an optical system, comprising a field angle change unit which has an operation unit and changes a photographing field angle in accordance with operation of the operation unit, a display unit which displays an object indicating a photographing condition and/or a state of the image sensing apparatus, and a size change unit which changes a size of an object displayed on the display unit, in accordance with operation of the operation unit.

According to a preferred embodiment of the present invention, the image sensing apparatus can further comprise a selection unit which selects at least one of a plurality of objects displayed on the display unit. The size change unit can be arranged to, e.g., change a size of an object selected by the selection unit. Alternatively, the size change unit may be arranged to reduce a size of an object which is not selected by the selection unit when a size of an object selected by the selection unit is increased in accordance with operation of the operation unit. Alternatively, the size change unit may be arranged to increase a size of an object which is not selected by the selection unit when a size of an object selected by the selection unit is reduced in accordance with operation of the operation unit.

According to a preferred embodiment of the present invention, the size change unit can be arranged to change a size of an object displayed on the display unit at a magnification corresponding to operation of the operation unit.

According to a preferred embodiment of the present invention, the size change unit can be arranged to increase a size of an object displayed on the display unit when the operation unit is so operated as to change the photographing field angle to a telephoto side and can be arranged to reduce the size of the object displayed on the display unit when the operation unit is so operated as to change the photographing field angle to a wide-angle side. Alternatively, the size change unit can be arranged to increase a size of an object selected by the selection unit when the operation unit is so operated as to change the photographing field angle to a telephoto side and can be arranged to reduce the size of the object selected by the selection unit when the operation unit is so operated as to change the photographing field angle to a wide-angle side.

According to a preferred embodiment of the present invention, in the image sensing apparatus, a memory area which holds object data for displaying an object indicating the photographing condition and/or the state of the image sensing apparatus and a memory area for temporarily holding a photographed image can separately be provided.

According to a preferred embodiment of the present invention, the size change unit can be arranged to change a size of an object displayed on the display unit by scaling the object data held in the memory.

According to the present invention, there is provided a display control method of controlling information displayed on a display unit of an image sensing apparatus for photographing an object through an optical system, comprising a display step of displaying an object indicating a photographing condition and/or a state of the image sensing apparatus on the display unit, and a size change step of changing a size of an object displayed on the display unit, in accordance with operation of an operation unit for changing a photographing field angle.

According to the present invention, there is provided a display control program for controlling information displayed on a display unit of an image sensing apparatus for photographing an object through an optical system, including a display step of displaying an object indicating a photographing condition and/or a state of the image sensing apparatus on the display unit, and a size change step of changing a size of an object displayed on the display unit, in accordance with operation of an operation unit for changing a photographing field angle.

According to the present invention, the size of an object indicating a photographing condition and/or the state of an image sensing apparatus displayed on a display unit can be changed by simple operation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Image sensing apparatuses according to the present invention can include, e.g., a silver halide camera which optically records an image on a film, an electronic camera (digital camera such as a digital movie camera, digital still camera, or a combination of them) which electronically records an image on an electronic recording medium (memory medium such as an EEPROM or hard disk), and the like. The image sensing apparatuses of the present invention can also include any apparatus having an image sensing function such as an information processor (e.g., a personal computer) having an image sensing function or a portable terminal (e.g., a cellular phone set) having an image sensing function. The image sensing apparatuses of the present invention can further include one in which an image sensing optical system (lens) is integrally included or one in which the image sensing optical system can be replaced with another.

Figure 1:
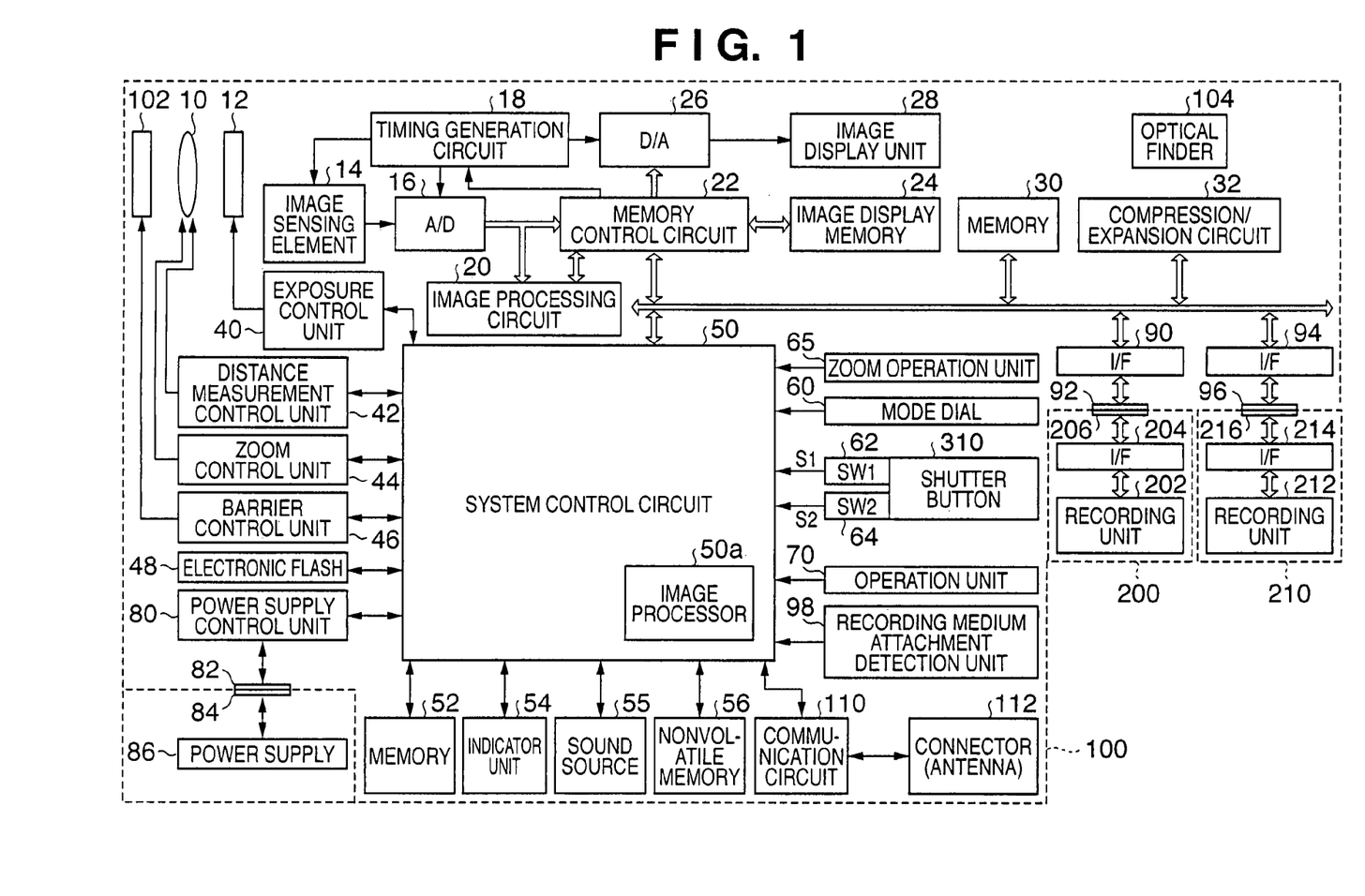
FIG. 1 is a diagram showing an embodiment in which an image sensing apparatus according to the present invention is applied to an electronic camera.

The best mode for carrying out the present invention will be described below. FIG. 1 is a diagram showing an exemplary embodiment in which an image sensing apparatus according to the present invention is applied to an electronic camera. An image sensing apparatus 100 is arranged to photograph an object image through an optical system (image sensing lens) 10. The optical system 10 can be formed as a zoom lens (lens which can change a photographing field angle). This provides an optical zoom function (so-called optical zoom). The image sensing apparatus 100 can also have an electronic zoom function (so-called electronic zoom) implemented by electronically trimming an image sensed by an image sensing element 14. Note that the image sensing apparatus 100 may be arranged to have only one of the optical and electronic zoom functions. The optical system 10 may be replaced with another. In this case, an electrical signal may be supplied from the main body of the image sensing apparatus 100 to the optical system 10, and a driving mechanism in the optical system 10 may drive a zooming lens, thereby providing the zoom function. Alternatively, a driving mechanism which mechanically drives the zooming lens in the optical system 10 may be provided in the main body of the image sensing apparatus 100.

A light beam from an object (light beam incident within an optical field angle) passes through the optical system (photographic lens) 10 and forms an optical image of the object on the image sensing plane of the image sensing element (e.g., a CCD sensor or CMOS sensor) 14 through an aperture of a shutter 12 having a stop function. The image sensing element 14 converts the optical image into an electrical analog image signal and outputs the obtained signal. An A/D converter 16 converts the analog image signal from the image sensing element 14 into a digital image signal. The image sensing element 14 and/or A/D converter 16 is controlled by a clock signal or control signal supplied from a timing generation circuit 18. The timing generation circuit 18 is controlled by a memory control circuit 22 and a system control circuit 50.

An image processing circuit 20 executes image processing such as pixel interpolation processing or color conversion processing for image data (digital image signal) from the A/D converter 16 or image data from the memory control circuit 22. The image processing circuit 20 also arithmetically processes data for AF (Auto Focus) processing, AE (Auto Exposure) processing, and EF (automatic brightness control by Electronic Flash pre-emission) processing of TTL (Through The Lens) scheme on the basis of image data sensed by the image sensing element 14 and supplies the arithmetic result to the system control circuit 50. The system control circuit 50 controls an exposure control unit 40 and a distance measurement control unit (AF control unit) 42 on the basis of the arithmetic result, thereby implementing AE and AF functions. The image processing circuit 20 also executes AWB (Auto White Balance) processing of TTL scheme on the basis of the image data sensed by the image sensing element 14.

The memory control circuit 22 controls the A/D converter 16, the timing generation circuit 18, the image processing circuit 20, an image display memory 24, a D/A converter 26, a memory 30, and a compression/expansion circuit 32.

Image data output from the A/D converter 16 is written in the image display memory 24 or memory 30 through the image processing circuit 20 and memory control circuit 22, or not through the image processing circuit 20 but directly through the memory control circuit 22.

Display image data written in the image display memory 24 is converted into a display analog image signal by the D/A converter 26 and is supplied to an image display unit 28. In this manner, a sensed image is displayed on the image display unit 28. Sequentially displaying a sensed image on the image display unit 28 implements an electronic finder function. The image display unit 28 can arbitrarily turn on/off display in accordance with an instruction from the system control circuit 50. When display is turned off, power consumption of the image sensing apparatus 100 can largely be reduced.

The memory 30 is used to store a photographed (sensed as an image to be recorded on a recording medium) still image or moving image. The capacity and access speed (write speed and read speed) of the memory 30 can arbitrarily be determined. However, to allow panoramic photography or continuous shooting for continuously taking a plurality of still images, the memory 30 needs an appropriate capacity and access speed. The memory 30 can also be used as a work area of the system control circuit 50.

The compression/expansion circuit 32 compresses/expands image data by, e.g., ADCT (Adaptive Discrete Cosine Transform). The compression/expansion circuit 32 can be arranged to load image data stored in the memory 30, compress or expand it, and write the processed image data in the memory 30.

The exposure control unit 40 controls the shutter 12 having a stop function on the basis of information supplied from the system control circuit 50. The exposure control unit 40 can also has a flash brightness control function in cooperation with an electronic flash (light emitting unit) 48. The electronic flash 48 also has a flash brightness control function and an AF auxiliary light projecting function.

The distance measurement control unit 42 controls a focusing lens of the optical system 10 on the basis of information from the system control circuit 50. A zoom control unit 44 controls zooming of the optical system 10. A barrier control unit 46 controls the operation of a barrier 102 which protects the optical system 10.

The system control circuit 50 is arranged to control the entire image sensing apparatus 100 and includes an image processor 50a which executes enlargement/reduction of an object (object to be displayed) indicating photographing conditions and/or the state of the image sensing apparatus and the like. A memory 52 stores constants, variables, and programs for the operations of the system control circuit 50, object data for displaying an object on the image display unit 28, and the like. Unlike image data generated by image sensing, object data is held in a memory area different from one for temporarily holding image data. Object data can typically be written in the memory 52 before shipping of the image sensing apparatus 100. Alternatively, object data may be rewritten by the user on the basis of data downloaded through a telecommunication line or data supplied to the user in a recording medium, or may be rewritten in a service center or the like, after shipping of the image sensing apparatus 100.

An indicator unit (e.g., an LCD or LED) 54 and a sound source (e.g., a speaker) 55 each comprise one or a plurality of elements. The indicator unit 54 and sound source 55 output the operation state or a message by using characters, images, or sound in accordance with execution of a program by the system control circuit 50 and are arranged at appropriate positions of the image sensing apparatus 100. Some of the indicator elements constituting the indicator unit 54 can be arranged in an optical finder 104.

Of pieces of information displayed on the indicator unit 54, ones displayed on an LCD or the like are the single shot/continuous shooting mode, self timer, compression ratio, number of recording pixels, number of recorded images, number of recordable images, shutter speed, F-number, exposure compensation, flash, red-eye effect relaxation, macro photography, buzzer setting, timer battery level, battery level, error, information by a plurality of digits, attached state of a recording medium 200 or 210, operation of communication I/F, date/time, and the like.

Of the pieces of information displayed on the indicator unit 54, ones displayed in the optical finder 104 are in-focus, camera shake warning, electronic flash charge, shutter speed, F-number, exposure compensation, and the like.

A nonvolatile memory 56 is an electrically erasable/recordable memory such as an EEPROM. Object data may be stored in the nonvolatile memory 56.

A first shutter switch (SW1) 62 is turned on midway during the operation of a shutter button 310 (pressed halfway) and instructs the system control circuit 50 to start AF (Auto Focus) processing, AE (Auto Exposure) processing, AWB (Auto White Balance) processing, EF (Electronic Flash pre-emission) processing, or the like. A second shutter switch (SW2) 64 is turned on at the end of operation of the shutter button 310 (pressed fully) and instructs the system control circuit 50 to start a series of processing operations (photography) including a process of reading an image signal from the image sensing element 14, causing the A/D converter 16 to convert the image signal into digital image data, causing the image processing circuit 20 to process the image data, and writing the processed data in the memory 30 through the memory control circuit 22, and a process of reading out the image data from the memory 30, causing the compression/expansion circuit 32 to compress the image data, and writing it in the recording medium 200 or 210.

A zoom operation unit 65 is operated by a photographer to change the photographing field angle (zoom magnification or photographing magnification). The zoom operation unit 65 can comprise, e.g., a sliding operation member or lever operation member and a switch or sensor which detects the operation of the operation member. When the zoom operation unit 65 is operated while a menu is displayed on the image display unit 28, the image sensing apparatus 100 changes the sizes of some or all of a plurality of item objects constituting the menu.

Figure 2:
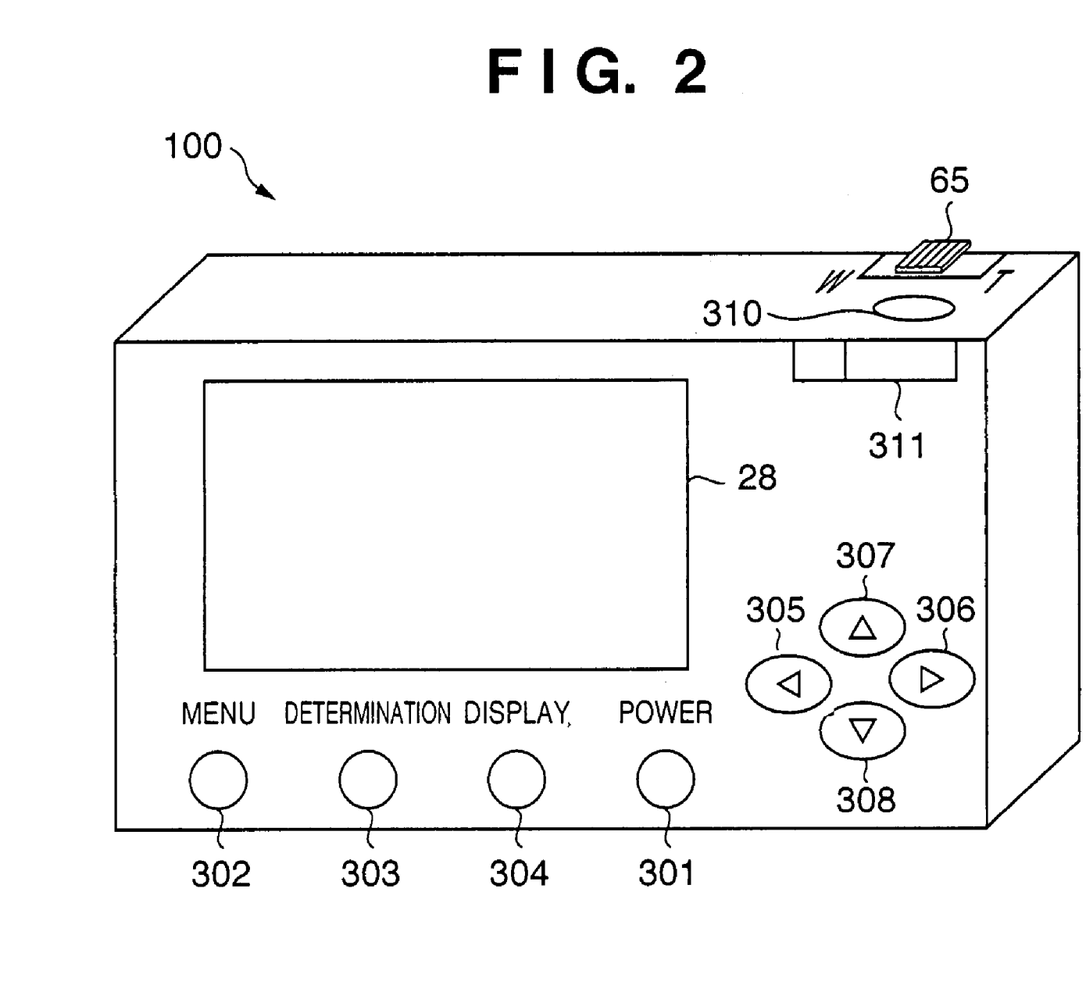
FIG. 2 is a view showing an example of the outer appearance of the image sensing apparatus shown in FIG. 1.

The operation unit 70 includes buttons or switches 301 to 310 shown in FIG. 2. These buttons or switches 301 to 310 are operated to turn on/off the power, set or change photographing conditions, confirm the photographing conditions, confirm the state of the image sensing apparatus 100, and confirm a photographed image.

A power supply control unit 80 includes a power detection circuit, DC/DC converter, and switch circuit which selects a block to be energized. The power supply control unit 80 detects the presence/absence of the power supply, power supply type, and battery level, controls the DC/DC converter on the basis of the detection result and an instruction from the system control circuit 50, and supplies a necessary voltage to blocks for a necessary period. The main body of the image sensing apparatus 100 and a power supply 86 have connectors 82 and 84, respectively, and are connected to each other through the connectors. The power supply 86 is, e.g., a primary cell such as an alkaline cell or lithium cell, a secondary cell such as an NiCd cell, NiMH cell, or Li cell, or an AC adapter.

The recording media 200 and 210 are connected to connectors 92 and 96, respectively, of the main body of the image sensing apparatus 100 through connectors 206 and 216. The recording medium 200 or 210 includes an interface 204 or 214 and a recoding unit 202 or 212 such as a semiconductor memory or hard disk and is connected to a bus within the image sensing apparatus 100 through an interface 90 or 94 of the main body of the image sensing apparatus 100. A recording medium attachment detection unit 98 detects whether the recording medium 200 or 210 is connected to the connector 92 or 96.

In this example, two systems of interfaces and connectors for recording media are provided. However, one system or three or more systems may be provided. If a plurality of systems of interfaces and connectors are provided, they may have different arrangements. Interfaces and connectors based on a standard such as a PCMCIA card or CF (compact flash) card can be used.

When interfaces and connectors based on a standard such as a PCMCIA card or CF (compact flash) card are adopted as the interfaces 90 and 94 and connectors 92 and 96, and various kinds of communication cards such as a LAN card, modem card, USB card, IEEE1394 card, P1284 card, SCSI card, or communication card for PHS are connected, image data or management information associated with the image data can be transferred to/from another computer or a peripheral device such as a printer.

Photography can be executed by using only the optical finder 104 without using the electronic finder function by the image display unit 28. Display elements partially constituting the indicator unit 54 such as ones for, e.g., in-focus indication, camera shake warning indication, electronic flash charge indication, shutter speed indication, F-number indication, and exposure compensation indication can be arranged within the optical finder 104.

A communication unit 110 provides various kinds of communication functions such as USB, IEEE1394, P1284, SCSI, modem, LAN, RS232C, and wireless communication. The communication circuit 110 can be connected to a connector 112 to connect the image sensing apparatus 100 to another device and can be connected to an antenna to provide a wireless communication function.

FIG. 2 is a view showing an example of the outer appearance of the image sensing apparatus 100. Note that unnecessary parts are not illustrated in FIG. 2 for the sake of descriptive simplicity.

A power button 301 is used to start/stop the image sensing apparatus 100 or turn on/off the main power supply of the image sensing apparatus 100. A menu button 302 is used to display a menu (which is so formed as to include a plurality of selectable and/or variable items) for setting various kinds of photographing conditions and displaying the state of the image sensing apparatus 100. For example, modes and items which can be set can include a photography mode (a program mode, stop priority mode, shutter speed priority mode, or the like is set to determine exposure), panoramic photography mode, playback mode, multiwindow playback/erase mode, PC connection mode (PC means a computer such as a personal computer), exposure compensation, electronic flash setting, single shot/continuous shot switching, self timer setting, recording image quality setting, data/time setting, protection of recorded images, and the like. For example, when the menu button 302 is pressed, the system control circuit 50 causes the image display unit 28 to display a menu. The menu may be merged into a sensed image or may be displayed alone (e.g., displayed against a predetermined background color). When the menu button 302 is pressed again while the menu is displayed, the system control circuit 50 ends the display of the menu on the image display unit 28.

A determination button 303 is pressed to determine or select a mode or item. When the determination button 303 is pressed, the system control circuit 50 sets a currently selected mode or item. A display button 304 is used to turn on/off display of the photography information on a sensed image or switch on/off the electronic finder function by the image display unit 28.

A left button 305, right button 306, up button 307, and down button 308 are used to, e.g., change a selected one (cursor or highlighted portion) out of a plurality of choices (e.g., items or images), change the position of an indicator specifying a selected choice, or increase/decrease a numeric value (e.g., a correction value or a numeric value indicating the date and time). The user interface is preferably arranged such that two or more items as well as only one item can be selected from a plurality of items using the left button 305, right button 306, up button 307, and down button 308. For example, when the left button 305, right button 306, up button 307, or down button 308 is operated while the determination button 303 is kept pressed, the system control circuit 50 can recognize that two or more items specified by the operation are selected.

As described above, the shutter button 310 can be arranged to, e.g., instruct the system control circuit 50 to start AF (Auto Focus) processing, AE (Auto Exposure) processing, AWB (Auto White Balance) processing, EF (Electronic Flash pre-emission) processing, or the like when it is pressed halfway. The shutter button 310 can also be arranged to instruct the system control circuit 50 to execute photography when it is fully pressed.

The zoom operation unit 65 is operated by a photographer to change the photographing field angle (zoom magnification or photographing magnification), as described above. When the zoom operation unit 65 is operated while a menu is displayed on the image display unit 28, the system control circuit 50 correspondingly changes the sizes of some or all of a plurality of item objects (GUI widgets) constituting the menu. To change only the sizes of some of the plurality of item objects (GUI widgets) constituting the menu, the sizes of objects selected by a photographer or the user are changed.

Although the operation unit is expressed as a lever-type one in FIG. 2, it may change the photographing field angle by operating the zoom ring of the zoom lens by the user. More specifically, the operation unit may electronically detect the amount and direction (i.e., the telephoto side or wide side) of the operation of the zoom ring by the user and may change the sizes of some or all of a plurality of item objects constituting the menu on the basis of the detection result.

A recording/playback switch 311 is used to switch from a recording mode to a playback mode and vice versa.

Note that a dial switch may be adopted or another operation system may be adopted, instead of the above-mentioned operation system.

Figure 3:
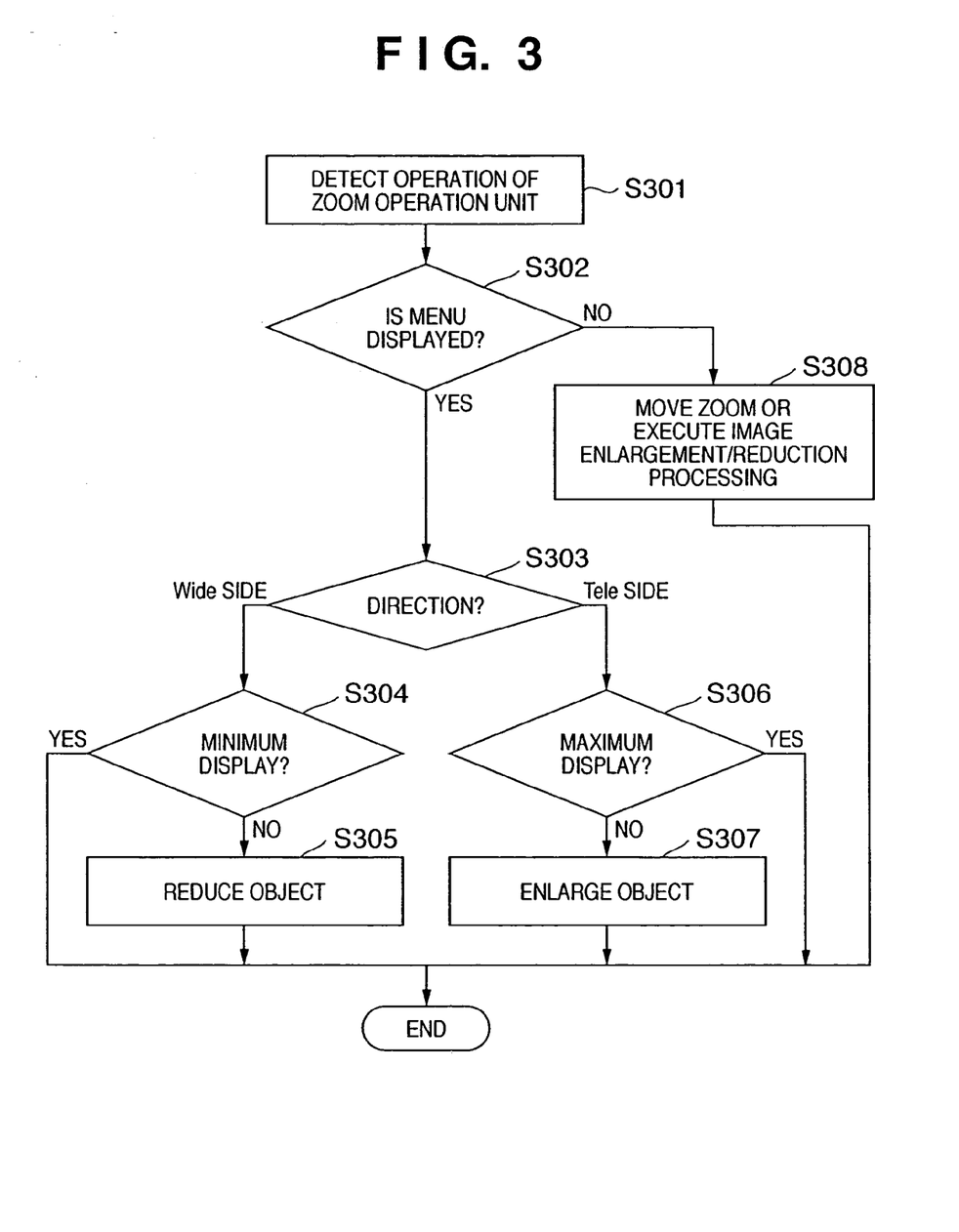
FIG. 3 is a flowchart showing processing in a system control circuit related to the operation of a zoom operation unit.

Three examples of processing in the system control circuit 50 related to the operation of the zoom operation unit 65 will be described below. FIG. 3 is a flowchart showing processing in the system control circuit 50 related to the operation of the zoom operation unit. All the examples will be described with reference to FIG. 3 as to their processing procedures. A program for controlling the processing shown in FIG. 3 is stored in, e.g., the memory 52 or nonvolatile memory 56. The system control circuit 50 can be arranged to operate in accordance with the program. This program can be rewritten through a telecommunication line or by a program supplied in a recording medium.

In the first example, if it is detected in step S301 that the zoom operation unit 65 is operated, the system control circuit 50 determines in step S302 whether a menu is displayed on the image display unit 28 to set photographing conditions or display the state of the image sensing apparatus 100. If the menu button 302 is formed as a toggle switch for turning on/off display of the menu, this determination can be made on the basis of the state of the toggle switch.

If YES in step S302, the system control circuit 50 determines in step S303 on the basis of a signal supplied from the zoom operation unit 65 whether the zoom operation unit 65 is operated to a Wide side or Tele side. The Wide side means a direction in which the photographing field angle increases (i.e., a direction facing toward a wide-angle side) while the Tele side means a direction in which the photographing field angle decreases (i.e., a direction facing toward a telephoto side).

When the zoom operation unit 65 is operated to the Wide side, the system control circuit 50 determines in step S304 whether the sizes of objects indicating items constituting the menu displayed on the image display unit 28 (characters, symbols, and the like indicating the meanings of the items) are the minimum ones.

If YES in step S304, the system control circuit 50 ends the series of processing operations because the sizes can be reduced no more. On the other hand, if NO in step S304, the system control circuit 50 causes the image processor 50a to reduce the objects and displays the reduced objects on the image display unit 28 in step S305.

If the zoom operation unit 65 is operated to the Tele side, the system control circuit 50 determines in step S306 whether the sizes of objects indicating the items constituting the menu displayed on the image display unit 28 are the maximum ones.

If YES in step S306, the system control circuit 50 ends the series of processing operations because the sizes can be enlarged no more. On the other hand, if NO in step S306, the system control circuit 50 causes the image processor 50a to enlarge the objects and displays the enlarged objects on the image display unit 28 in step S307.

Reduction and enlargement of objects by the image processor 50a can be executed at a stepwise or continuous enlargement/reduction ratio in accordance with the way in which the zoom operation unit 65 is operated (e.g., the length of operation time). In stepwise reduction/enlargement, objects of an appropriate size may be selected and used from objects of a plurality of sizes previously stored in the memory 52 or the like, or objects of one or a plurality of sizes previously stored in the memory 52 or the like may be scaled. In reduction/enlargement at a continuous reduction/enlargement ratio, objects of one or a plurality of sizes previously stored in the memory 52 or the like may be scaled at the reduction/enlargement ratio.

If NO in step S302, the system control circuit 50 changes the photographing field angle in accordance with the operation of the zoom operation unit 65 in step S308. In this case, if the photographing field angle is changed by the optical zoom function, the system control circuit 50 instructs the zoom control unit 44 to change the field angle, thereby moving the zoom lens of the optical system 10. Note that in some optical systems, a focusing lens or any other lens moves as a zoom lens moves. If zooming is executed by the electronic zoom function, for example, the system control circuit 50 instructs the image processing circuit 20 to change the field angle, process image data supplied from the image sensing element 14 through the A/D converter 16, and trim part of the image so as to obtain a photographing field angle specified by the zoom operation unit 65.

Figure 4:
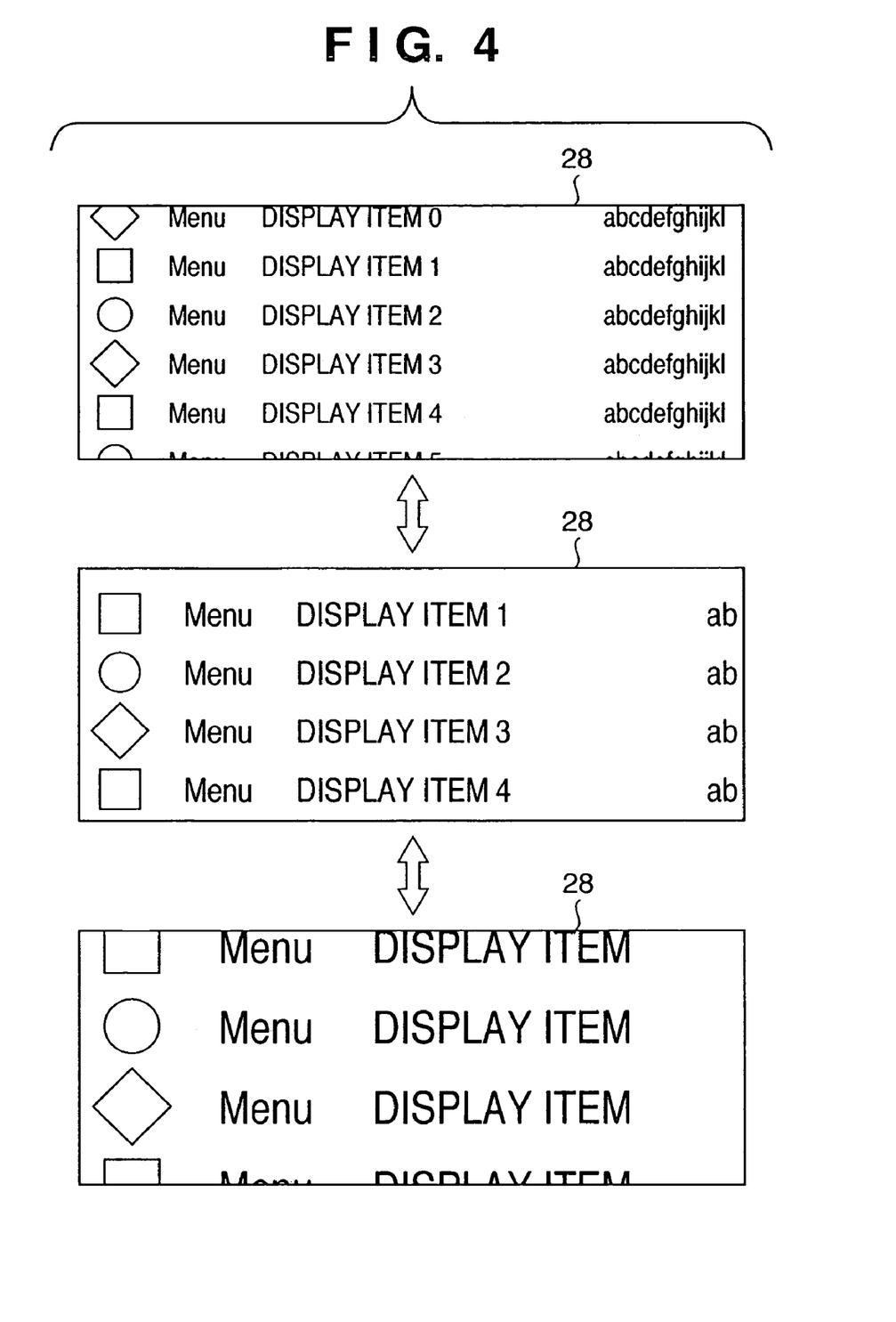
FIG. 4 schematically shows the first example wherein the size of an object indicating an item is changed upon operation of the zoom operation unit.

FIG. 4 schematically shows how the sizes of objects indicating items are changed in accordance with the operation of the zoom operation unit 65 in the above-mentioned processing. If the zoom operation unit 65 is operated to the Wide side, the image sensing apparatus shifts from a display state on the right side to a display state on the left side. On the other hand, if the zoom operation unit 65 is operated to the Tele side, the image sensing apparatus shifts from the display state on the left side to the display state on the right side.

Since the zoom operation unit 65 is typically arranged to be capable of changing the photographing field angle to both the Wide side and Tele side, the zoom operation unit 65 is suitable for giving an instruction to reduce/increase the sizes of objects (items) displayed on the image display unit 28. When the zoom operation unit 65 is utilized to give an instruction to change the sizes of displayed objects, the instruction can be given without adding any special or additional operation unit. The zoom function is used in photography but is unnecessary in changing or setting photographing conditions. It causes no disadvantage to change the sizes of objects (items) using the zoom operation unit 65 in changing or setting the photographing conditions. Assume an interface in which objects displayed on the image display unit 28 are reduced when the zoom operation unit 65 is operated to the Wide side while they are enlarged when the zoom operation unit 65 is operated to the Tele side. This interface is easy for a photographer to understand.

The above-mentioned first example has an aspect as an example wherein all objects of menu items displayed on the image display unit 28 are reduced/enlarged in accordance with the operation of the zoom operation unit 65.

In the second example, an example will be described wherein some of menu items displayed on the image display unit 28 (e.g., selected item objects) are reduced/enlarged in accordance with the operation of the zoom operation unit 65, and unselected item objects are reduced/enlarged in a direction opposite to that of the operation of the zoom operation unit 65 (a direction in which the unselected objects are reduced in the case of operation to the telephoto side of the zoom operation unit or a direction in which the unselected objects are enlarged in the case of operation to the wide-angle side).

If it is detected in step S301 that the zoom operation unit 65 is operated, the system control circuit 50 determines in step S302 whether a menu is displayed on the image display unit 28 to set or display photographing conditions.

If YES in step S302, the system control circuit 50 determines in step S303 on the basis of a signal supplied from the zoom operation unit 65 whether the zoom operation unit 65 is operated to the Wide side or Tele side.

If the zoom operation unit 65 is operated to the Wide side, the system control circuit 50 determines in step S304 whether the size of a selected one out of a plurality of item objects constituting the menu displayed on the image display unit 28 is the minimum one. Note that a selected item means, e.g., one selected using the buttons 305 to 308.

If YES in step S304, the system control circuit 50 ends the series of processing operations because the size can be reduced no more. On the other hand, if NO in step S304, the system control circuit 50 causes the image processor 50a to reduce the selected item object and (if possible) enlarge unselected item objects and displays the reduced object and enlarged objects on the image display unit 28 in step S305.

If the zoom operation unit 65 is operated to the Tele side, the system control circuit 50 determines in step S306 whether the size of the selected one out of the plurality of item objects constituting the menu displayed on the image display unit 28 is the maximum one.

If YES in step S306, the system control circuit 50 ends the series of processing operations because the size can be enlarged no more. On the other hand, if NO in step S306, the system control circuit 50 causes the image processor 50a to enlarge the selected item object and (if possible) reduce the unselected item objects and displays the enlarged object and reduced objects on the image display unit 28 in step S307.

Reduction and enlargement of objects by the image processor 50a can be executed at a stepwise or continuous enlargement/reduction ratio in accordance with the way in which the zoom operation unit 65 is operated (e.g., the length of operation time).

If NO in step S302, the system control circuit 50 changes the photographing field angle in accordance with the operation of the zoom operation unit 65 in step S308.

Figure 5:
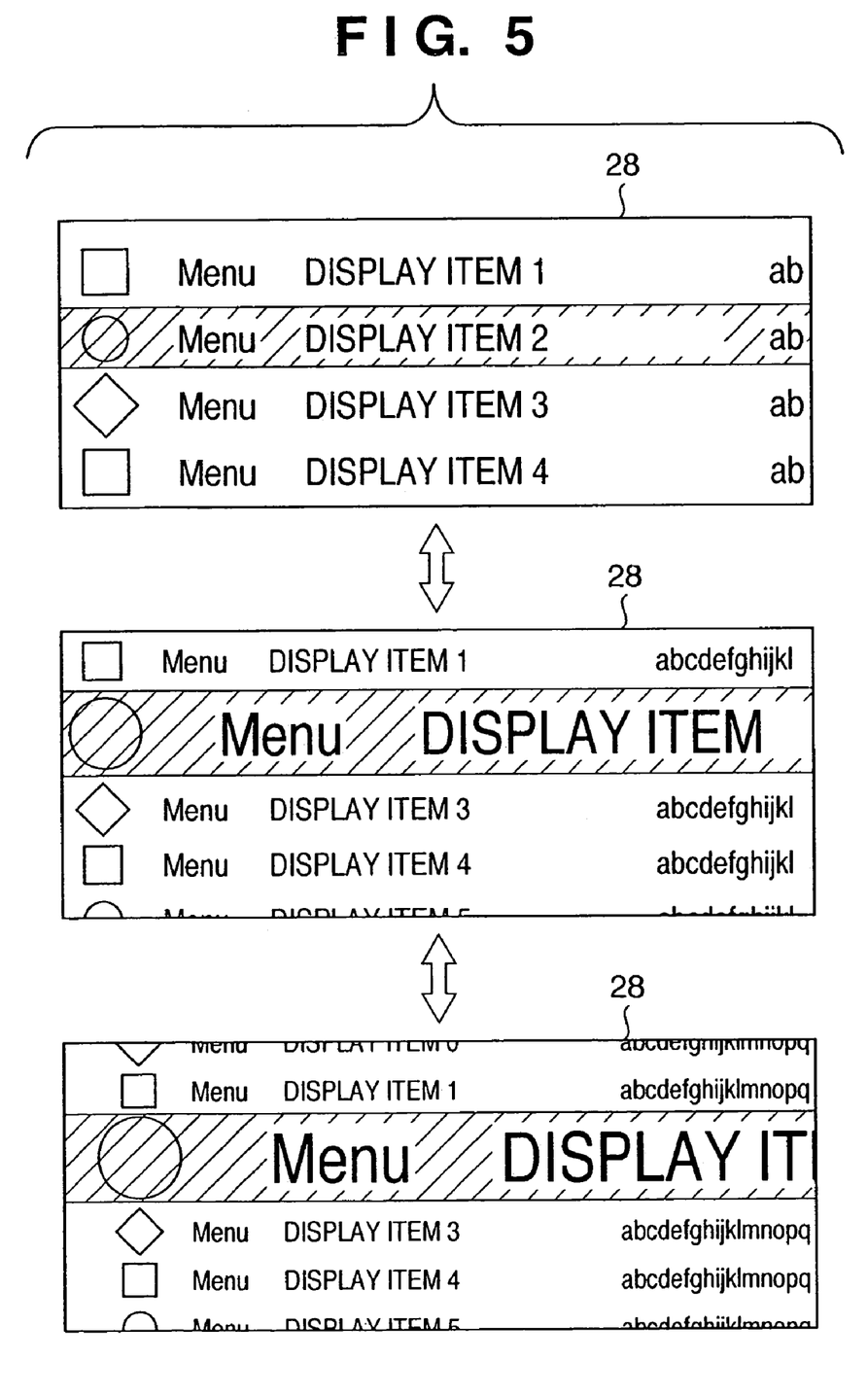
FIG. 5 schematically shows the second example wherein the size of an object indicating an item is changed upon operation of the zoom operation unit.

FIG. 5 schematically shows how the sizes of objects indicating items are changed in accordance with the operation of the zoom operation unit 65 in the above-mentioned processing. In FIG. 5, an item which is distinguished from the remaining items (highlighted item) is a selected one. If the zoom operation unit 65 is operated to the Wide side, the image sensing apparatus shifts from a display state on the right side to a display state on the left side. At this time, the selected item object is reduced while the unselected item objects are enlarged. On the other hand, if the zoom operation unit 65 is operated to the Tele side, the image sensing apparatus shifts from the display state on the left side to the display state on the right side. At this time, the selected item object is enlarged while the unselected item objects are reduced.

With the above-mentioned processing, an item object on which a photographer wants to focus can be displayed in an enlarged scale while others can be displayed in a reduced scale. Thus, information can be supplied to the photographer by effectively utilizing the limited display area of the image display unit 28.

In the third example, some of menu items displayed on the image display unit 28 (e.g., only selected item objects) are reduced/enlarged in accordance with the operation of the zoom operation unit 65.

If it is detected in step S301 that the zoom operation unit 65 is operated, the system control circuit 50 determines in step S302 whether a menu is displayed on the image display unit 28 to set or display photographing conditions.

If YES in step S302, the system control circuit 50 determines in step S303 on the basis of a signal supplied from the zoom operation unit 65 whether the zoom operation unit 65 is operated to the Wide side or Tele side.

If the zoom operation unit 65 is operated to the Wide side, the system control circuit 50 determines in step S304 whether the size of a selected one out of a plurality of item objects constituting the menu displayed on the image display unit 28 is the minimum one. Note that a selected item means, e.g., one selected using the buttons 305 to 308.

If YES in step S304, the system control circuit 50 ends the series of processing operations because the size can be reduced no more. On the other hand, if NO in step S304, the system control circuit 50 causes the image processor 50a to reduce the selected item object and displays the reduced object on the image display unit 28 in step S305. At this time, the display position of each item object which is not to be reduced is preferably arranged again in response to the reduction of the selected item object.

If the zoom operation unit 65 is operated to the Tele side, the system control circuit 50 determines in step S306 whether the size of the selected one out of the plurality of item objects constituting the menu displayed on the image display unit 28 is the maximum one.

If YES in step S306, the system control circuit 50 ends the series of processing operations because the size can be enlarged no more. On the other hand, if NO in step S306, the system control circuit 50 causes the image processor 50a to enlarge the selected item object and displays the enlarged object on the image display unit 28 in step S307. At this time, the display position of each item object which is not to be enlarged is preferably arranged again in response to the enlargement of the selected item object.

Reduction and enlargement of objects by the image processor 50a can be executed at a stepwise or continuous enlargement/reduction ratio in accordance with the way in which the zoom operation unit 65 is operated (e.g., the length of operation time).

If NO in step S302, the system control circuit 50 changes the photographing field angle in accordance with the operation of the zoom operation unit 65 in step S308.

Figure 6:
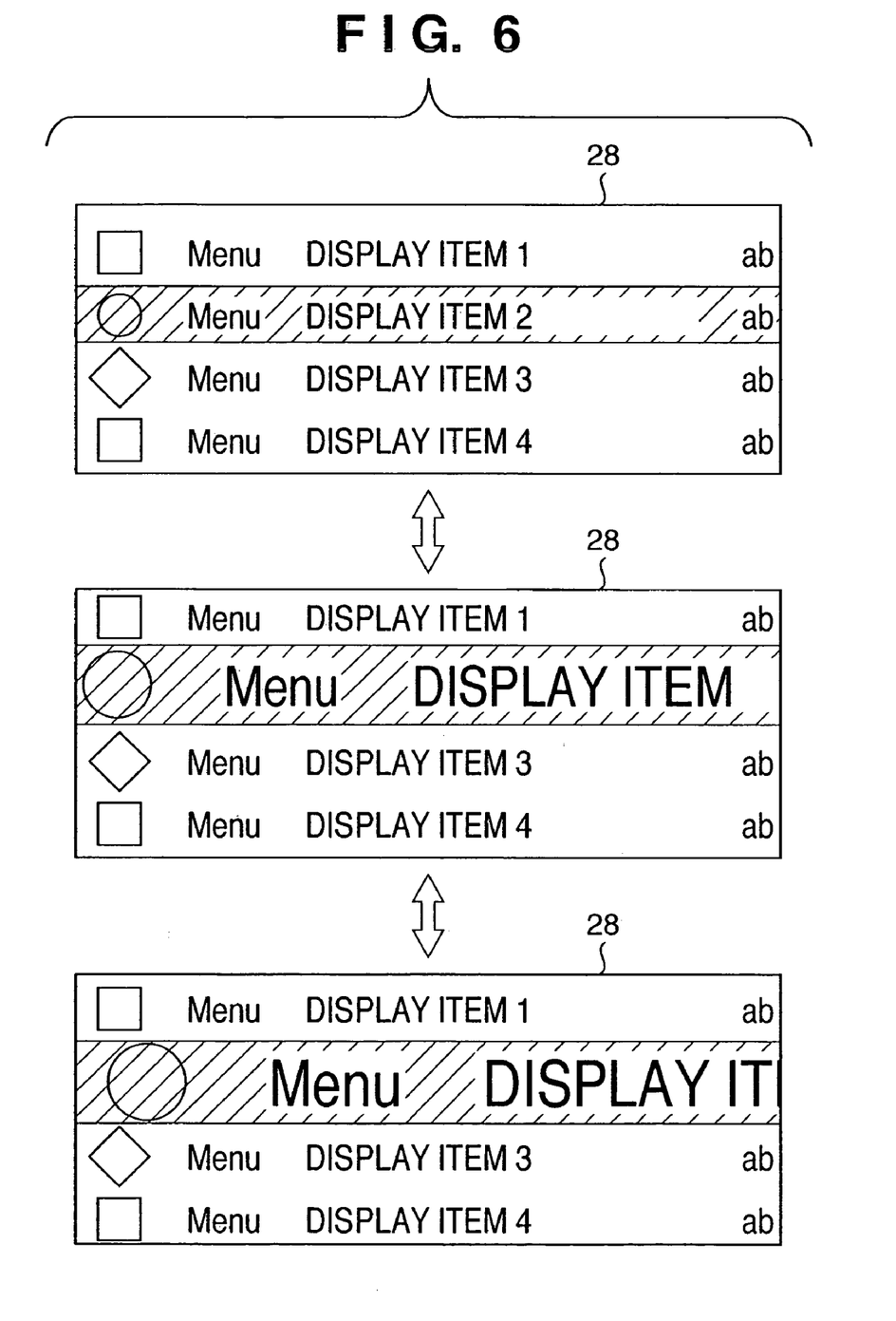
FIG. 6 schematically shows the third example wherein the size of an object indicating an item is changed upon operation of the zoom operation unit.

FIG. 6 schematically shows how the size of an object indicating an item is changed in accordance with the operation of the zoom operation unit 65 in the above-mentioned processing. If the zoom operation unit 65 is operated to the Wide side, the image sensing apparatus shifts from a display state on the right side to a display state on the left side. At this time, only the selected item object (highlighted item) is reduced. On the other hand, if the zoom operation unit 65 is operated to the Tele side, the image sensing apparatus shifts from the display state on the left side to the display state on the right side. At this time, only the selected item object is enlarged.

With the above-mentioned processing, an item object on which a photographer wants to focus is displayed in an enlarged scale to increase the visibility. Others are so displayed as to have a predetermined size, and thus the visibility is not excessively impaired.

Reduction and enlargement of objects by the image processor 50a will be described below. As described above, in stepwise object reduction/enlargement, objects of an appropriate size may be selected and used from objects of a plurality of sizes previously stored in the memory 52 or the like, or objects of one or a plurality of sizes previously stored in the memory 52 or the like may be scaled. In reduction/enlargement at a continuous reduction/enlargement ratio, objects of one or a plurality of sizes previously stored in the memory 52 or the like may be scaled at the reduction/enlargement ratio.

If objects of a plurality of sizes are stored in a memory, the amount of data becomes huge. In scaling, the outline of an enlarged object becomes jagged due to the limited pixel resolution. The line shape of a reduced font is not assured, and the font may not look like a character.

Figure 7:
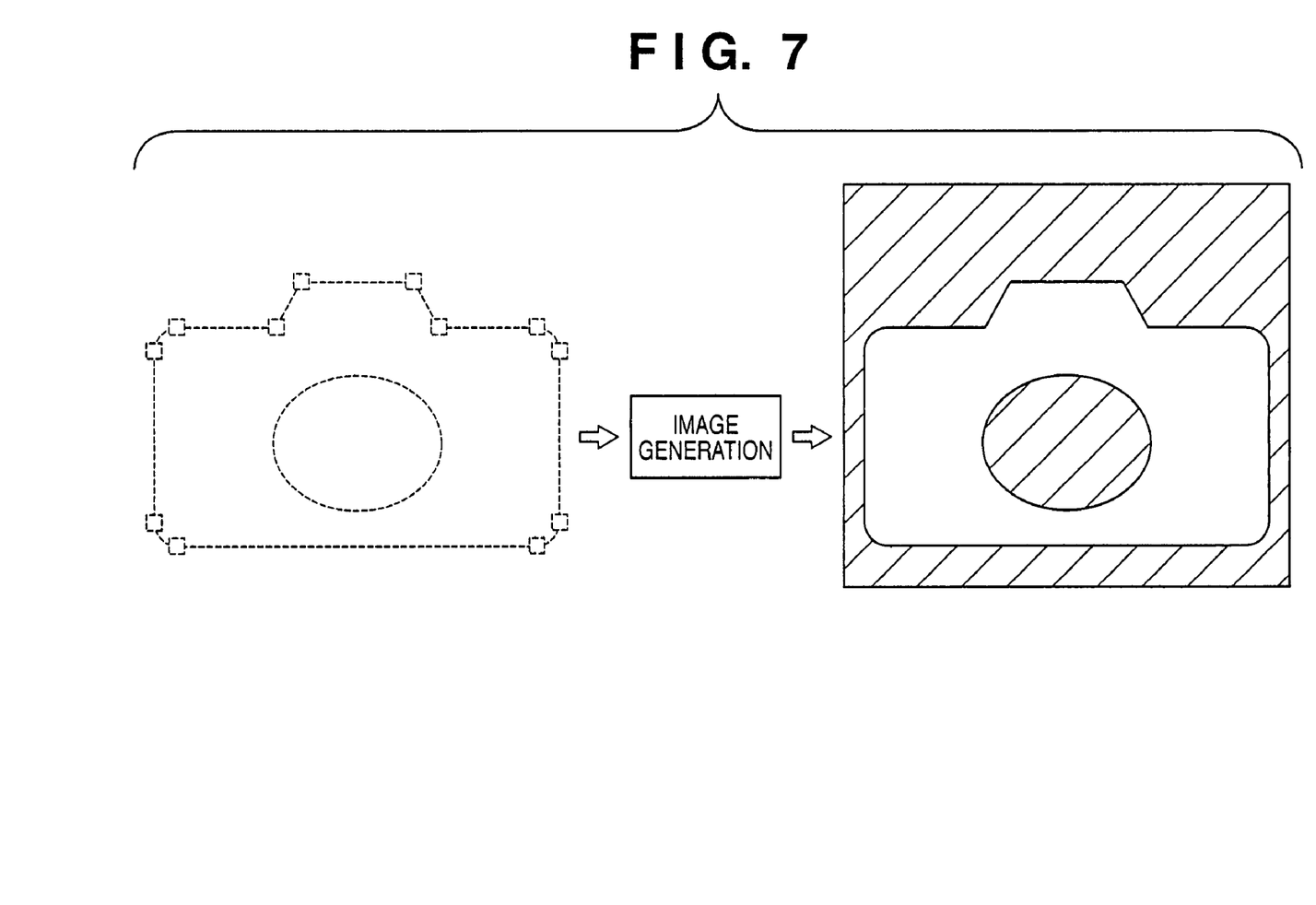
FIG. 7 is a view for explaining a vector graphics technique.

Under the circumstances, to solve the above-mentioned problems, a vector graphics technique which needs a relatively small amount of data and can smoothly execute drawing in a reduced or enlarged scale is preferably used. As shown in FIG. 7, the vector graphics technique holds the shape of each object as a plurality of base point data and the association between them. The vector graphics technique draws line segments associated with the base point data at the time of drawing and fills a closed zone formed by the drawing as needed, thereby forming a graphic pattern. To form a line segment, multi-dimensional curve drawing by arithmetic operations can be used in addition to a method of connecting base points with straight lines. At the time of multicolor drawing, antialiasing can be executed to display outlines more smoothly in an enlarged scale. These functions need more complicated arithmetic operations and must be used properly in accordance with the application purpose of a graphic pattern to be drawn.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-368924 filed on Oct. 29, 2003, the entire contents of which is hereby incorporated by reference herein.

What is claimed is:

1. An image sensing apparatus for photographing an object through an optical system, comprising:
   an operation unit that changes a photographing field angle;
   a display unit which displays a plurality of objects constituting a menu, each of the plurality of objects indicating a photographing condition and/or a state of the image sensing apparatus; and
   a size change unit which changes a size of at least one of the plurality of objects displayed on said display unit, in accordance with an operation of the operation unit.

2. The apparatus according to claim 1, further comprising a selection unit which selects at least one of the plurality of objects displayed on said display unit, wherein said size change unit is arranged to change a size of an object selected by said selection unit.

3. The apparatus according to claim 1, further comprising a selection unit which selects at least one of the plurality of objects displayed on said display unit, wherein said size change unit is arranged to reduce a size of an object which is not selected by said selection unit when a size of an object selected by said selection unit is increased in accordance with an operation of said operation unit.

4. The apparatus according to claim 1, further comprising a selection unit which selects at least one of the plurality of objects displayed on said display unit, wherein said size change unit is arranged to increase a size of an object which is not selected by said selection unit when a size of an object selected by said selection unit is reduced in accordance with an operation of said operation unit.

5. The apparatus according to claim 1, wherein said size change unit is arranged to change a size of at least one of the plurality of objects displayed on said display unit at a magnification corresponding to an operation of said operation unit.

6. The apparatus according to claim 1, wherein said size change unit is arranged to increase a size of an object displayed on said display unit when said operation unit is so operated as to change the photographing field angle to a telephoto side and is arranged to reduce the size of the object displayed on said display unit when said operation unit is so operated as to change the photographing field angle to a wide-angle side.

7. The apparatus according to claim 2, wherein said size change unit is arranged to increase a size of an object selected by said selection unit when said operation unit is so operated as to change the photographing field angle to a telephoto side and is arranged to reduce the size of the object selected by said selection unit when said operation unit is so operated as to change the photographing field angle to a wide-angle side.

8. The apparatus according to claim 1, wherein a memory area which holds object data for displaying an object indicating the photographing condition and/or the state of the image sensing apparatus and a memory area for temporarily holding a photographed image are separately provided.

9. The apparatus according to claim 8, wherein said size change unit is arranged to change a size of an object displayed on said display unit by scaling the object data held in the memory.

10. A display control method of controlling information displayed on a display unit of an image sensing apparatus for photographing an object through an optical system, comprising:
a display step of displaying a plurality of objects constituting a menu, each of the plurality of objects indicating a photographing condition and/or a state of the image sensing apparatus on the display unit; and
a size change step of changing a size of at least one of the plurality of objects displayed on the display unit, in accordance with an operation of an operation unit that changes a photographing field angle.

* * * * *